US010386837B2

(12) United States Patent
Min

(10) Patent No.: US 10,386,837 B2
(45) Date of Patent: Aug. 20, 2019

(54) VEHICLE HAVING AUTOMATIC DRIVING CONTROL SYSTEM AND METHOD FOR CONTROLLING THE SAME

(71) Applicant: HYUNDAI MOTOR COMPANY, Seoul (KR)

(72) Inventor: KyungDeuk Min, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 180 days.

(21) Appl. No.: 15/466,896

(22) Filed: Mar. 23, 2017

(65) Prior Publication Data

US 2018/0181121 A1 Jun. 28, 2018

(30) Foreign Application Priority Data

Dec. 22, 2016 (KR) ........................ 10-2016-0176336

(51) Int. Cl.

| | |
|---|---|
| ***G05D 1/00*** | (2006.01) |
| ***B60W 30/08*** | (2012.01) |
| ***B60W 10/04*** | (2006.01) |
| ***B60W 10/18*** | (2012.01) |
| ***B60W 40/04*** | (2006.01) |
| ***B60W 50/10*** | (2012.01) |
| ***B60T 7/22*** | (2006.01) |

(52) U.S. Cl.

CPC .............. *G05D 1/0061* (2013.01); *B60T 7/22* (2013.01); *B60W 10/04* (2013.01); *B60W 10/18* (2013.01); *B60W 30/08* (2013.01); *B60W 40/04* (2013.01); *B60W 50/10* (2013.01); *B60T 2201/022* (2013.01); *B60W 2540/10* (2013.01); *B60W 2550/142* (2013.01); *B60W 2550/20* (2013.01); *B60W 2710/18* (2013.01); *B60W 2900/00* (2013.01); *G05D 2201/0213* (2013.01)

(58) Field of Classification Search

None

See application file for complete search history.

(56) References Cited

U.S. PATENT DOCUMENTS

| | | | | |
|---|---|---|---|---|
| 6,192,309 | B1 | 2/2001 | Prestl et al. | |
| 7,177,749 | B2 | 2/2007 | Sekiguchi | |
| 2004/0030497 | A1 * | 2/2004 | Knoop | B60T 7/042 701/301 |

(Continued)

FOREIGN PATENT DOCUMENTS

| | | | |
|---|---|---|---|
| JP | H11-291790 | A | 10/1999 |
| JP | 2000-043618 | A | 2/2000 |
| JP | 2013-132933 | A | 7/2013 |

*Primary Examiner* — Mussa A Shaawat
*Assistant Examiner* — Abdhesh K Jha
(74) *Attorney, Agent, or Firm* — Morgan Lewis & Bockius LLP

(57) ABSTRACT

A vehicle has an automatic driving control system which includes: a sensor configured to detect surroundings of the vehicle; and a controller configured to control automatic driving of the vehicle based on information obtained by the sensor, upon reception of a command for automatic driving from a user. The controller is further configured to determine whether there is possibility of accident based on a distance to a front vehicle and whether the user manipulates an input, and to release the automatic driving control of the vehicle based on the determination, when the vehicle is stopped in an automatic driving mode.

16 Claims, 8 Drawing Sheets

(56) References Cited

U.S. PATENT DOCUMENTS

| | | | | |
|---|---|---|---|---|
| 2014/0303827 | A1* | 10/2014 | Dolgov | B60W 30/00 701/23 |
| 2017/0261982 | A1* | 9/2017 | Otaki | B60W 40/09 |

* cited by examiner

VEHICLE HAVING AUTOMATIC DRIVING CONTROL SYSTEM AND METHOD FOR CONTROLLING THE SAME

CROSS-REFERENCE TO RELATED APPLICATION

This application claims the benefit of priority to Korean Patent Application No. 10-2016-0176336, filed on Dec. 22, 2016, the disclosure of which is incorporated herein by reference in its entirety.

TECHNICAL FIELD

The present disclosure relates to a vehicle and a method for controlling the same, and more particularly, to a technology to prevent a driver from feeling out of place due to sudden release of automatic driving control and sudden braking in an automatic driving mode.

BACKGROUND

In the modern society, vehicles are the most common transportation means, and more people have been using the vehicles. The development of auto technologies has a great influence in the modern society, e.g., making it easy to travel a long distance and making our lives more convenient.

Many electronic devices for vehicle for user convenience, such as hands-free systems, GPS receivers, Bluetooth devices, and terminals allowing easy pass through tollgates, have been developed, and furthermore, a communication device for communicating with a user equipment (UE) and a charging device for charging the UE have been available in vehicles.

Recently, various devices for assisting in driving a vehicle and giving smoother ride are equipped in the vehicle. For example, an automatic driving control system has been developed for the vehicle to be automatically driven to a destination while recognizing road conditions, determining driving conditions, and controlling the vehicle to be driven along a scheduled traveling route. Studies on the technology for automatic driving systems are actively going on these days.

The automatic driving control system recognizes the current location and speed of the vehicle, conditions and obstacles around the vehicle, generates a traveling route in real time based on obtained information to automatically drive the vehicle, and makes the vehicle enter into the automatic driving mode based on a distance to the front vehicle on the motorways.

Accordingly, an automatically driven vehicle keeps pace with a car running ahead, and if the front car is stopped, the automatically driven vehicle stops as well. When a certain period of time has passed after the vehicle stops, an automatic driving mode for the vehicle is released to prevent a collision with another vehicle or a pedestrian. Accordingly, the driver has to manipulate a switch again or step on the accelerator pedal to restart the vehicle.

However, while the vehicle is stopped, the driver may not always look ahead and may happen to recognize the start of the front car later on and manipulate the switch or accelerator pedal late. In this case, the front vehicle cannot be recognized so the automatic driving is impossible, and accordingly, control of the distance between vehicles is released. A collision might happen from creep driving once the control of the distance between vehicles is released, and so it is common to apply an Electronic Parking Brake (EPB) to avoid accident.

In this regard, since the driver does not put on the brake by him/herself, he/she may not clearly recognize whether the brake is applied. Furthermore, since there is no car in front of the vehicle, the driver might often hit the accelerator pedal. In this case, however, even though the driver slams on the accelerator pedal, the vehicle may not be accelerated, causing the rear wheel dragged, which might embarrass the driver and give a sense of incongruity.

SUMMARY

The present disclosure provides a vehicle to prevent the driver from feeling out of place due to sudden release of automatic driving control and braking in an automatic driving mode by recognizing a change in surrounding conditions when the vehicle is to be started again after stopping, to release the automatic driving mode and smoothly hand over the right to drivel the vehicle to the driver.

According to an exemplary embodiment of the present disclosure, a vehicle includes an automatic driving control system which comprises: a sensor configured to detect surroundings of the vehicle; and a controller configured to control automatic driving of the vehicle based on information obtained by the sensor, upon reception of a command for automatic driving from a user. The controller is configured to determine whether there is possibility of accident based on a distance to a front vehicle and whether the user manipulates an input, and to release the automatic driving control of the vehicle based on the determination, when the vehicle is stopped in an automatic driving mode.

The controller may determine whether there is possibility of accident, when the distance to the front vehicle exceeds a reference range and the user manipulates the input.

The input may include at least one of a switch to change driving modes of the vehicle and an accelerator pedal.

The controller may release the automatic driving control of the vehicle without determining possibility of accident when the user manipulates the accelerator pedal.

The controller may determine whether there is possibility of accident when the user manipulates the switch The controller may determine that there is possibility of accident when an inclination of a road the vehicle is running is greater than a reference inclination.

The controller may determine that there is possibility of accident when the inclination of the road is less than the reference inclination and a traveled route of the front vehicle is not identified.

The controller may set a virtual lane based on a driving route of the vehicle, calculate an estimated duration of creep driving based on a distance to an obstacle when there is the obstacle in the virtual lane, and determine that there is possibility of accident when the estimated duration is less than a reference period of time.

The controller may apply an electronic parking brake (EPB) and release automatic driving control of the vehicle, when determining that there is the possibility of accident.

The controller may maintain the automatic driving control of the vehicle without determining possibility of accident when the distance to the front vehicle is less than a reference range.

According to another exemplary embodiment of the present disclosure, a method of controlling a vehicle having an automatic driving control system includes: detecting surroundings of the vehicle; and controlling automatic driving of the vehicle based on the detected information, upon reception of a command for automatic driving from a user. The step of controlling the automatic driving comprises determining whether there is possibility of accident based on a distance to a front vehicle and whether the user manipulates an input; and releasing the automatic driving control of the vehicle based on the determination, when the vehicle is stopped in an automatic driving mode.

The step of determining whether there is possibility of accident may include determining whether there is possibility of accident, when the distance to the front vehicle exceeds a reference range and the user manipulates the input.

The input may include at least one of a switch to change driving modes of the vehicle and an accelerator pedal.

The step of releasing the automatic driving control of the vehicle may include releasing the automatic driving control of the vehicle without determining possibility of accident when the user manipulates the accelerator pedal.

The step of determining whether there is possibility of accident may include determining whether there is possibility of accident when the user manipulates the switch.

The step of determining whether there is possibility of accident may include determining that there is possibility of accident when an inclination of a road the vehicle is running is greater than a reference inclination.

The step of determining whether there is possibility of accident may include determining that there is possibility of accident when the inclination of the road is less than the reference inclination and a traveled route of the front vehicle is not identified.

The step of determining whether there is possibility of accident may include setting a virtual lane based on a driving route of the vehicle, calculating an estimated duration of creep driving based on a distance to an obstacle when there is the obstacle in the virtual lane, and determining that there is possibility of accident when the estimated duration is less than a reference period of time.

The step of releasing the automatic driving control of the vehicle may include applying an electronic parking brake (EPB) and releasing automatic driving control of the vehicle, when determining that there is the possibility of accident.

The method may further include maintaining the automatic driving control of the vehicle without determining possibility of accident when the distance to the front vehicle is less than a reference range.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Embodiments and features as described and illustrated in the present disclosure are only preferred examples, and various modifications thereof may also fall within the scope of the disclosure.

The terminology used herein is for the purpose of describing particular embodiments only and is not intended to limit the present disclosure. It is to be understood that the singular forms “a,” “an,” and “the” include plural references unless the context clearly dictates otherwise.

It will be further understood that the terms “include”, “comprise” and/or “have” when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, third, etc., may be used herein to describe various elements, components, regions, layers and/or sections, these elements, components, regions, layers and/or sections should not be limited by these terms.

Embodiments of the present disclosure will now be described in detail with reference to accompanying drawings to be readily practiced by an ordinary skill in the art. It should be noted that what is irrelative to the present disclosure is omitted from the drawings.

Figure 1:
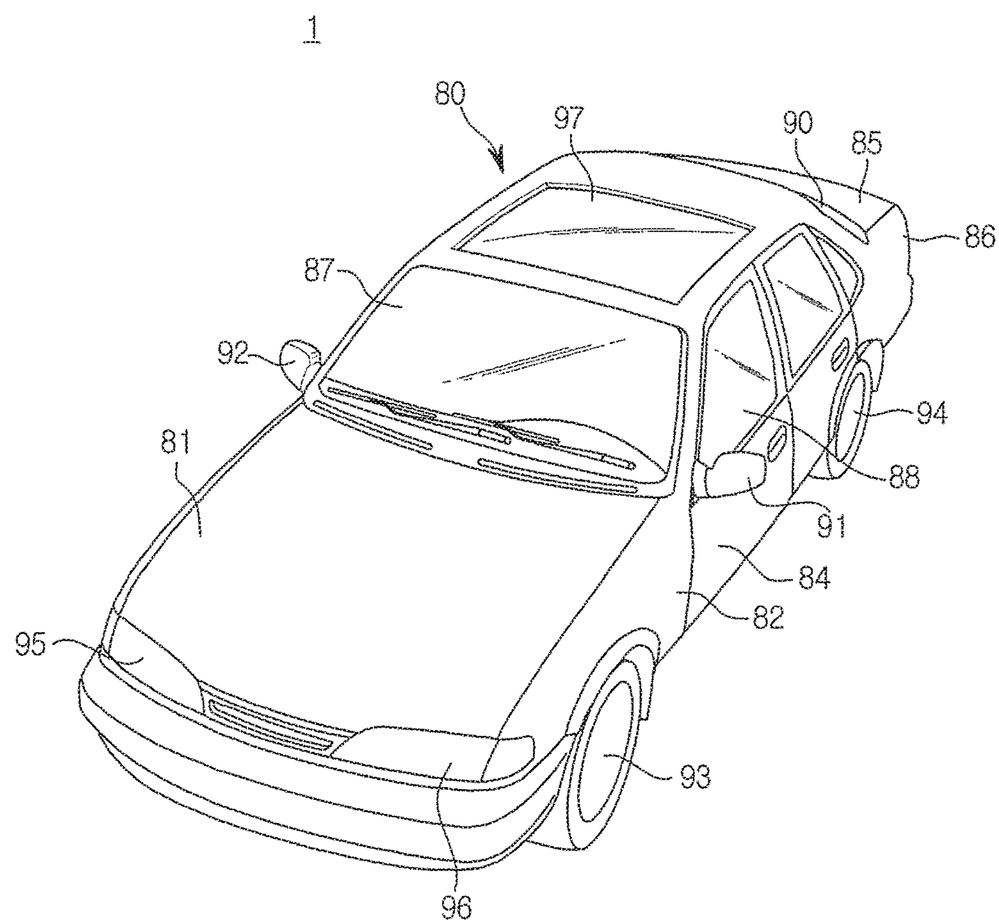
FIG. 1 is an exterior view of a vehicle, according to an embodiment of the present disclosure.
Figure 2:
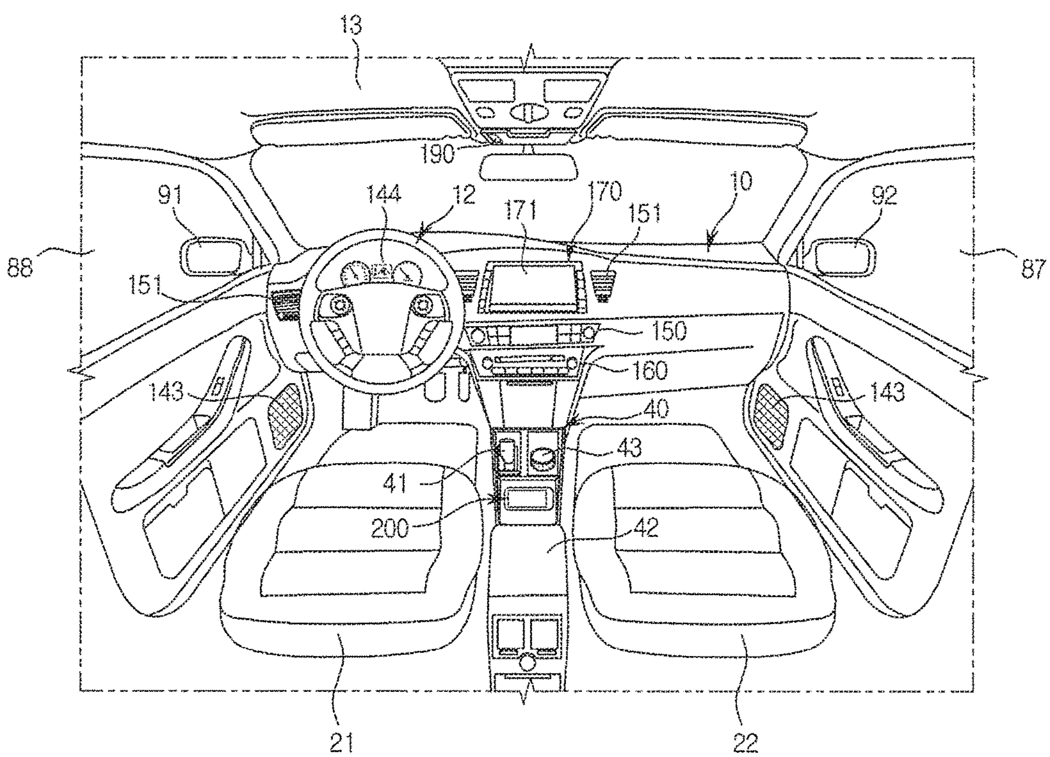
FIG. 2 is an interior view of a vehicle, according to an embodiment of the present disclosure.

FIG. 1 is an exterior view of a vehicle, according to an embodiment of the present disclosure, and FIG. 2 is an interior view of a vehicle, according to an embodiment of the present disclosure. The figures will now be described together to avoid overlapping explanation.

Referring to FIG. 1, a vehicle 1 may include a car frame 80 that forms the exterior of the vehicle 1, and wheels 93, 94 for moving the vehicle 1. The car frame 80 may include a hood 81, a front fender 82, doors 84, a trunk lid 85, and a quarter panel 86. The car frame 80 may also include a sunshine roof 97, as shown in FIG. 1. The term ‘sunshine roof’ 97 may be interchangeably used with a sun roof, which will be used herein for convenience of explanation.

Furthermore, there may be a front window 87 installed on the front of the car frame 80 to allow the driver and passengers to see a view ahead of the vehicle 1, side windows 88 to allow the driver and passengers to see side views, side mirrors 91, 92 installed on the doors 84 to allow the driver to see areas behind and to the sides of the vehicle 1, and a rear window 90 installed on the rear of the car frame 80 to allow the driver or passengers to see a view behind the vehicle 1.

The side mirrors 91, 92 may include mirrors for helping the user see views behind and sides to the vehicle 1, and covers 13 forming the exterior of the side mirrors 91, 92. Although not shown in FIGS. 1 and 2, sensors 110 may be included inside the side mirrors 91, 92 to detect conditions around the vehicle 1. The sensors 110 will be described later in detail with reference to FIGS. 3 and 4.

There may also be head lamps 95, 96 installed on the outer front of the car frame 80 of the vehicle 1 for turning on headlights to secure views ahead of the vehicle 1.

Furthermore, there may be tail lamps (not shown) installed on the rear of the car frame 80 of the vehicle 1 for turning on taillights to secure views behind the vehicle 1 or help a driver driving a car behind the vehicle 1 to locate the vehicle 1 as well. Operation of the sun roof 97, head lamps 95, 96, tail lamps of the vehicle 1 may be controlled according to control commands from the user. The internal features of the vehicle 1 will now be described.

An air conditioner 150 may be equipped in the vehicle 1. The air conditioner 150, as will be described below, refers to an apparatus for controlling air conditioning conditions including indoor/outdoor environmental conditions, air suction/exhaustion state, circulation state, cooling/heating state, etc., of the vehicle 1 automatically or in response to a control instruction from the user. For example, the vehicle 1 may include an air conditioner 150 to perform heating or cooling and release the heated or cooled air through vents 151 to control the temperature inside the vehicle 1.

There may be a navigation terminal 170 arranged in the vehicle 1. The navigation terminal 170 may refer to a system for providing Global Positioning System (GPS) functions to give the user directions to a destination.

The navigation terminal 170 may also provide an integrated audio and video function. The navigation terminal 170 may generate control signals according to control commands input from the user through various input devices to control devices in the vehicle 1.

For example, the navigation terminal 170 may selectively display at least one of audio, video, and navigation screens through a display 171, and may also display various control screens related to controlling the vehicle 1.

The display 171 may be located in a center fascia 11, which is a center area of a dashboard 10. In an embodiment, the display 201 may be implemented with Liquid Crystal Displays (LCDs), Light Emitting Diodes (LEDs), Plasma Display Panels (PDPs), Organic Light Emitting Diodes (OLEDs), Cathode Ray Tubes (CRTs), etc., without being limited thereto.

If the display 171 is implemented in a touch screen type, the display 171 may receive various control commands from the user through various touch gestures, such as touching, clicking, dragging, etc.

In the meantime, a center input unit 43 of a jog shuttle type or hard key type may be located in a center console 40. The center console 40 corresponds to a part located between a driver seat 21 and a passenger seat 22, and has a gear-shifting lever 41 and a tray 42.

A cluster 144 may be arranged in the vehicle 1. The cluster 144 may also be called an instrument panel, but for convenience of explanation, the term 'cluster' 144 will be just used in the following description. On the cluster 144, traveling speed, revolutions per minute (rpm), an amount of fuel left of the vehicle 1, etc., are indicated.

Furthermore, there may be a sound input unit 190 arranged in the vehicle 1. For example, the sound input unit 190 may be implemented with a microphone.

To receive a sound input more effectively, the sound input unit 190 may be mounted on a headlining 13, as shown in FIG. 2, or on the dashboard 10 or steering wheel 12, without being limited thereto.

Moreover, a speaker 143 for outputting sounds may be equipped in the vehicle 1. Accordingly, the vehicle 1 may output a sound through the speaker 143 required in performing audio, video, navigation, and other additional functions.

Apart from the aforementioned navigation input unit 102 and center input unit 43, other various input devices may be arranged inside the vehicle 1 to receive control commands for the aforementioned devices.

Figure 3:
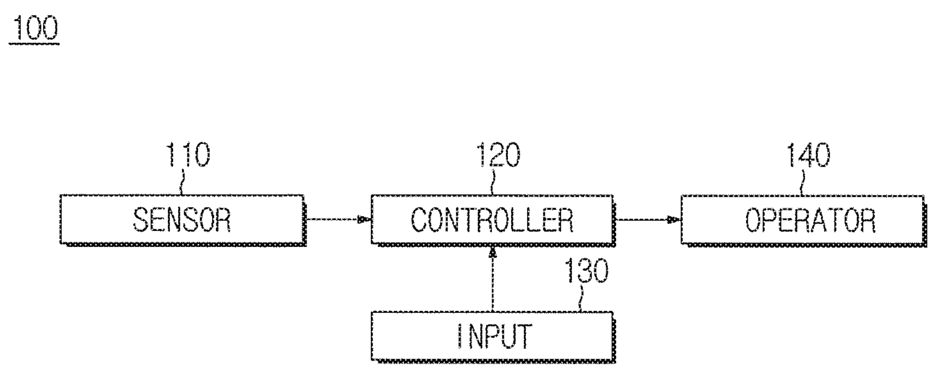
FIG. 3 is a block diagram of an automatic driving control system of a vehicle, according to an embodiment of the present disclosure.

FIG. 3 is a block diagram of an automatic driving control system of a vehicle, according to an embodiment of the present disclosure.

Referring to FIG. 3, an automatic driving control system 100 of the vehicle 1 may include the sensor 110 for detecting a condition around the vehicle 1, a controller 120 for controlling automatic driving of the vehicle 1 based on information obtained by the sensor 110 in response to a command for automatic driving received from the user, an input 130 for receiving a command about a driving mode of the vehicle 1 from the user, and an operator 140 for applying a brake based on a result determined by the controller 120.

Specifically, the sensor 110 may detect a current location and moving speed of the vehicle 1 and at the same time, detect conditions around the vehicle 1 and send the detected information to the controller 120.

The sensor 110 may be of many different types of sensor, and for the automatically driven vehicle in particular, a three dimensional (3D) laser range finder sensor is often used.

The 3D laser range finder sensor determines a distance to an object by a series of arithmetic operations after detecting a signal sent from a light source and then returned by being reflected off the object. A method for detecting a surrounding condition in this way may be referred to as a Time Of Flight (TOF), calculated using reception and reflection time of infrared rays.

In general, the 3D laser range finder sensor may measure a 3D range by rotation, vertical vibration, and pitch angle vibration of a reflecting mirror installed on a light emission and incidence path.

Upon reception of a command about automatic driving from the user, the controller 120 may control automatic driving of the vehicle 1 based on the information obtained by a sensor 110, and if the automatically driven vehicle 1 is stopped, determine if there is a possibility of accident based on the distance to a front vehicle and whether the user manipulates the input 130 and control driving of the vehicle 1 based on the determination.

Specifically, after the vehicle 1 is stopped, the controller 120 may determine whether there is a possibility of accident if the distance to a front vehicle exceeds a reference range and the user manipulates the input 130. If it is determined that there is the possibility of accident, the controller 120 may control the operator 140 to apply the EPB and release the automatic driving control. If it is determined that there is no possibility of accident, the brake is not applied and the right to drive the vehicle 1 is handed over to the user. This will be described in detail with reference to FIGS. 4 and 8.

The input 130 refers to a device for receiving a command about a driving mode of the vehicle from the user, which may specifically include a switch to change driving modes of the vehicle 1 and an accelerator pedal to speed up the vehicle 1.

The operator 140 may play a role to control various devices inside the vehicle 1 in response to received commands.

Specifically, the operator 140 may apply the EPB to prevent an accident in advance if the controller 120 determines that there is a possibility of accident.

Figure 4:
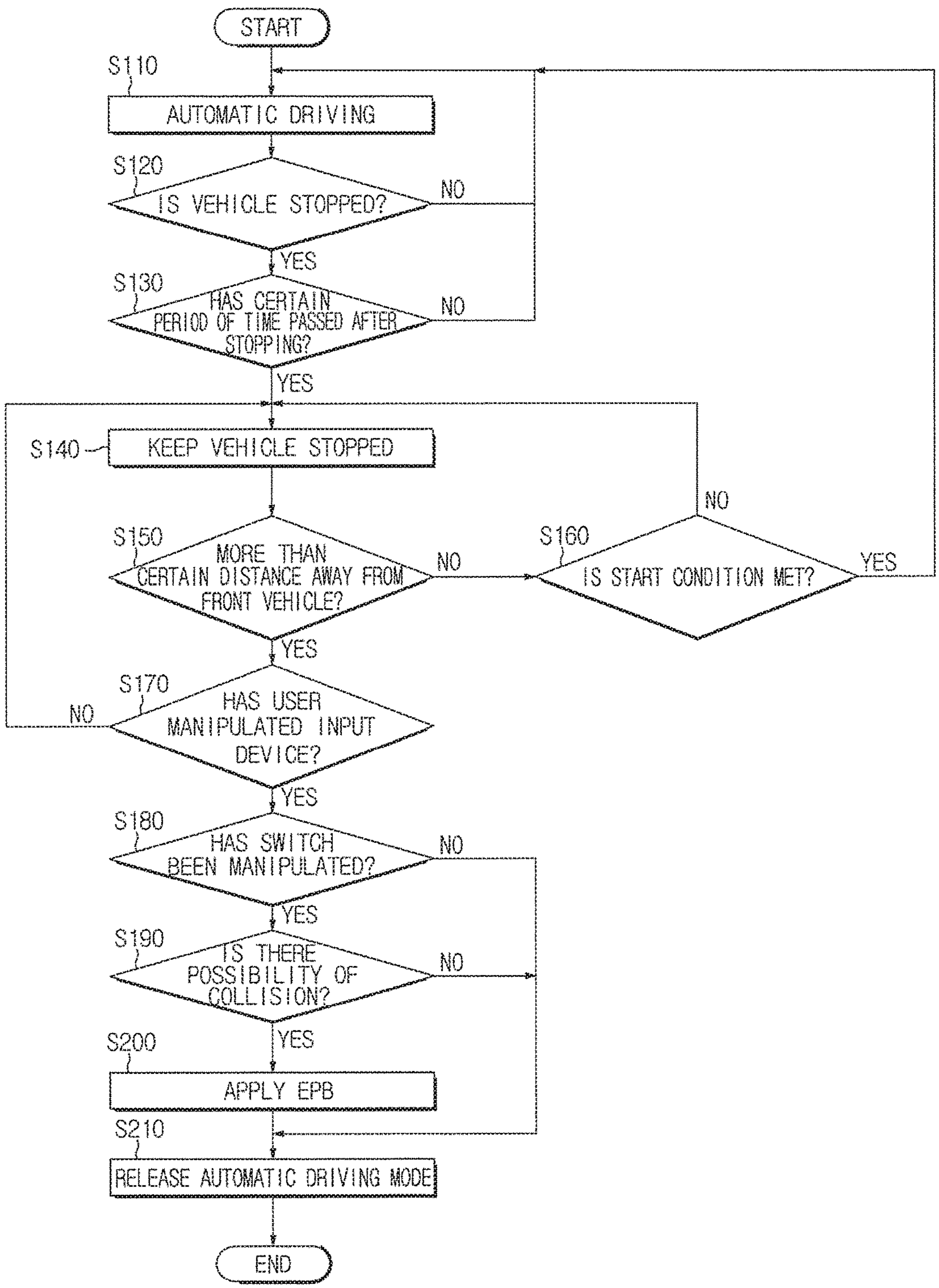
FIG. 4 is a flowchart illustrating a sequence of operation of a vehicle, according to an embodiment of the present disclosure.

The controller 120 may be a general electronic control unit (ECU). The various embodiments disclosed herein, including the automatic driving control system 100 and/or elements thereof, can be implemented using one or more processors coupled to a memory (or other non-transitory machine readable recording medium) storing computer-executable instructions for causing the processor(s) to perform the functions described above including the functions described in relation to the sensor 110, the controller 120, the input 130, and the operator 140. FIG. 4 is a flowchart illustrating a sequence of operation of a vehicle, according to an embodiment of the present disclosure.

Referring to FIG. 4, the vehicle 1 determines whether the vehicle 1 is stopped after entering into the automatic driving mode, in S110, S120.

If the vehicle 1 is not stopped, the process goes back to S110, but otherwise if the vehicle 1 is stopped, the vehicle 1 determines if a certain period of time has passed after the vehicle 1 was stopped, in S130.

Determining the lapse of the certain period of time after stopping of the vehicle 1 is to determine whether to keep the vehicle to remain stopped. If the certain period of time has passed after the vehicle 1 was stopped, the vehicle 1 keeps controlling the vehicle 1 to remain stopped to prevent collision, in S140

The vehicle 1 then determines if a distance to a front vehicle is greater than a certain distance, i.e., than the reference range, in S150.

The distance to a front vehicle may be determined using the sensor 110, and the reference range is a reference to determine whether to keep the vehicle 1 stopped to keep pace with the front vehicle, and refers to a least range within which automatic restart of the vehicle 1 is impossible taking into account appearance of a new obstacle.

If the distance to the front vehicle is less than the reference range after the vehicle 1 is stopped, it means that the front vehicle is present near the vehicle 1. Accordingly, in this case, the vehicle 1 should not be started right away, but determine whether a starting condition is met, in S160, and if the starting condition is met, the vehicle 1 resumes automatic driving, or otherwise if the starting condition is not met, the vehicle 1 controls itself to remain stopped.

If it is determined in S150 that the distance to the front vehicle is greater than the reference range, it is determined whether the user has manipulated the input 130, in S170.

If the distance to the front vehicle is greater than the reference range, it means that the front vehicle has started. Accordingly, in this case, it is common for the vehicle behind to start as well, and thus, it is determined whether the user wants to start the vehicle 1 based on the user's manipulation of the input 130.

That is, the vehicle behind does not always start following the start of the front vehicle, and thus determination is made about whether the user wants to start the vehicle 1 based on the user's manipulation of the input 130.

The input 130 refers to a device required to move the vehicle 1 forward, which may include a switch to change driving modes of the vehicle 1 and an accelerator pedal to speed up the vehicle 1.

If the user has manipulated the input 130, it is determined whether the input 130 is the switch, in S180.

If the user manipulates other input 130 than the switch, e.g., if the user puts on the acceleration pedal, the vehicle 1 releases the automatic driving mode right away and hands over the right to drive the vehicle 1 to the user, in S210.

If the user puts on the acceleration pedal, it means that the user typically looks carefully ahead and is able to easily recognize an obstacle or another vehicle, and thus the possibility of accident is low. In this case, it is not necessary to forcedly apply the brake, and so the automatic driving control mode is released and the right to drive the vehicle 1 is handed over to the user.

However, if the user has manipulated the switch, it is determined whether there is a possibility of a collision, in S190. If there is a possibility of a collision, the vehicle 1 applies EPB, releases the automatic driving control mode and hands over the right to drive the vehicle 1 to the user, in S200, S210.

After the procedure, the brake is not applied right after the control of distance between vehicles is released, but after determination of whether the user has manipulated the input device and whether there is a possibility of collision is made, it is determined whether to apply the brake and then the right to drive the vehicle 1 is handed over to the user, thereby guaranteeing more reliable handover of the right to drive the vehicle 1 to the user.

If the user puts on the accelerator pedal, the brake is not applied, thereby preventing a sense of incongruity that might be felt by the user when the vehicle is not started even though the user steps on the accelerator pedal.

A procedure of determining whether there is a possibility of collision, which is another characteristic of the present disclosure, will now be described in more detail.

Figure 5:
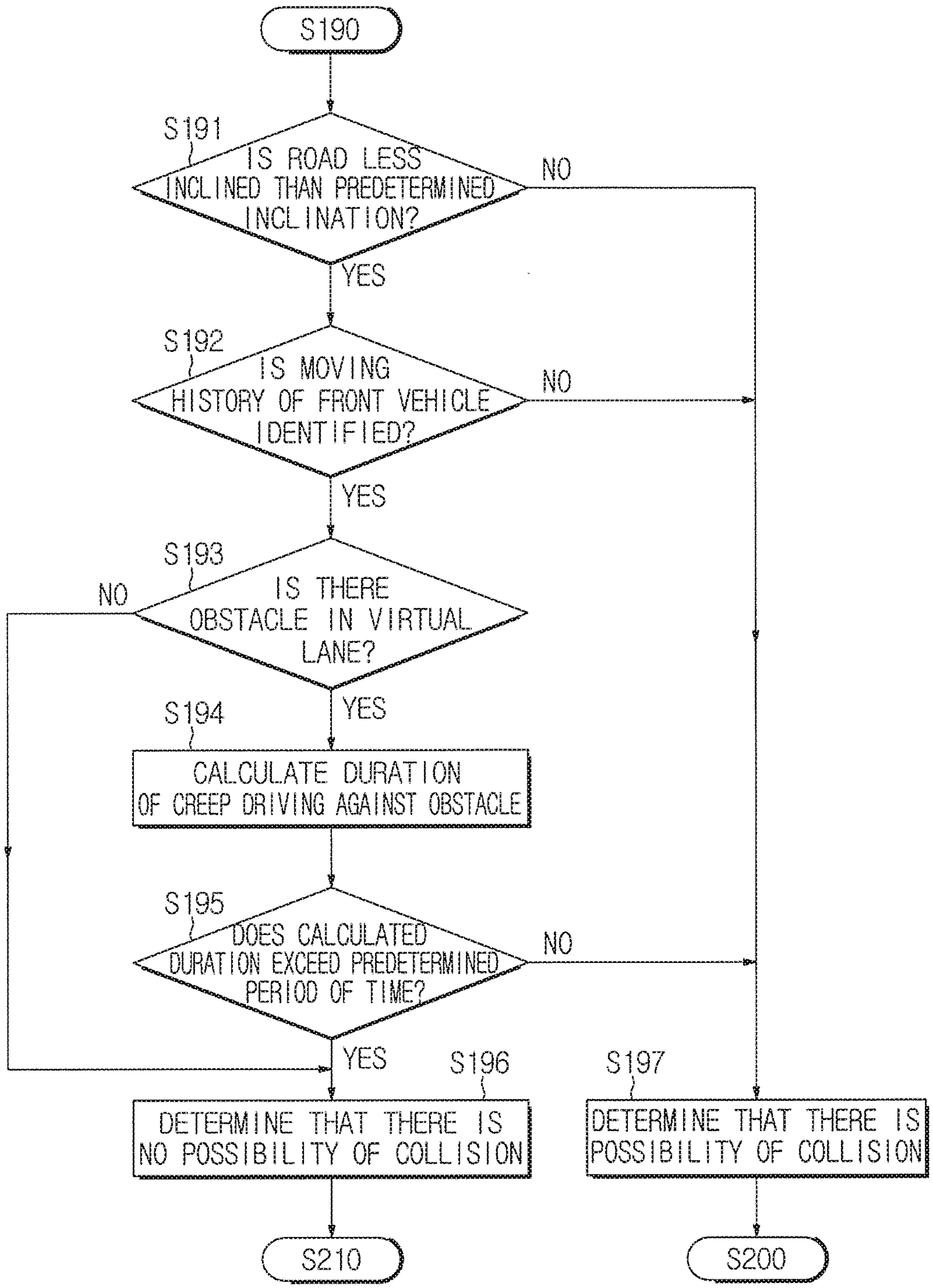
FIG. 5 is a flowchart illustrating a sequence of determining whether there is possibility of collision, according to an embodiment of the present disclosure.
Figure 6:
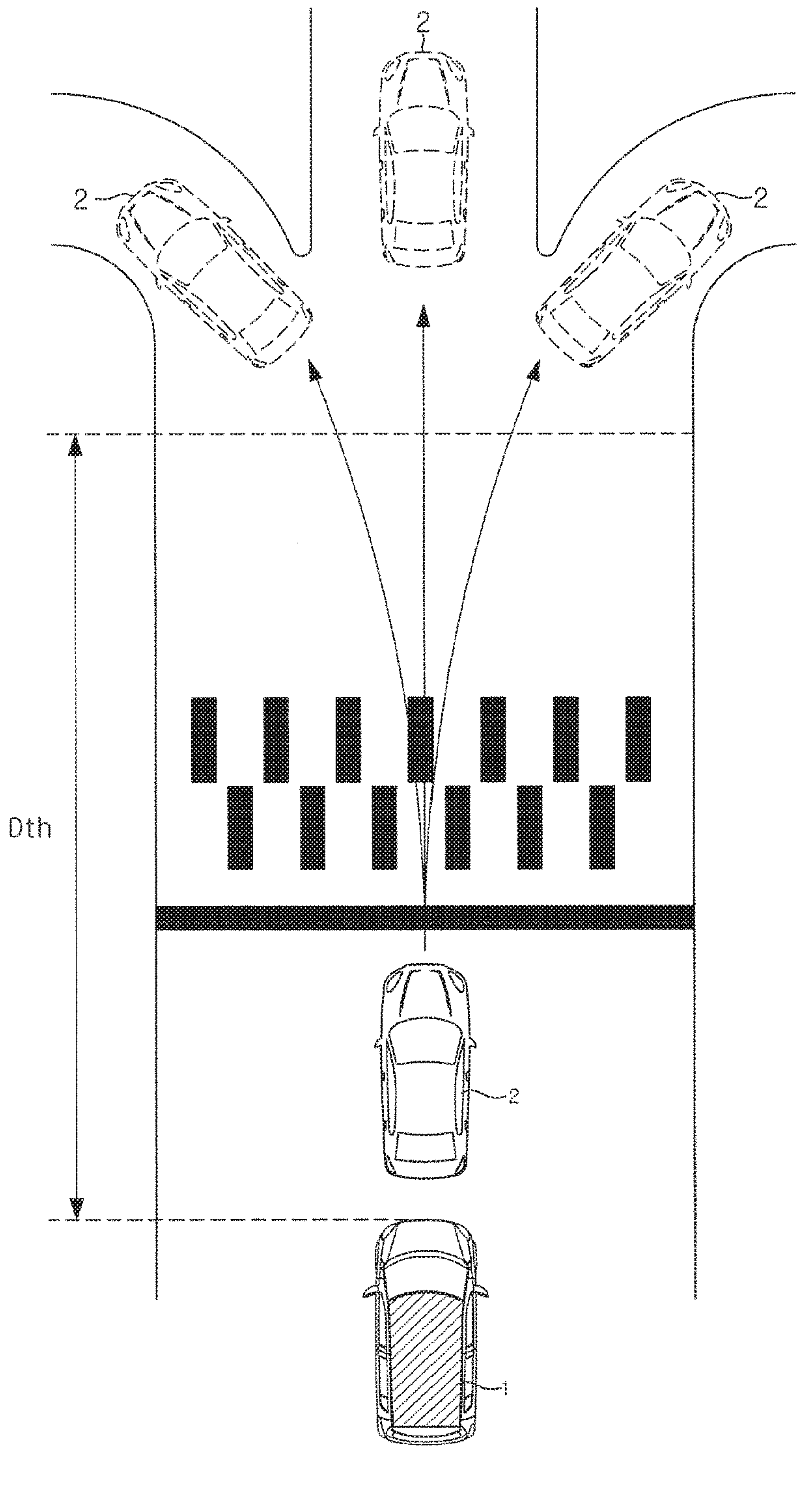
FIG. 6 shows moving history of the front car, according to an embodiment of the present disclosure.
Figure 7:
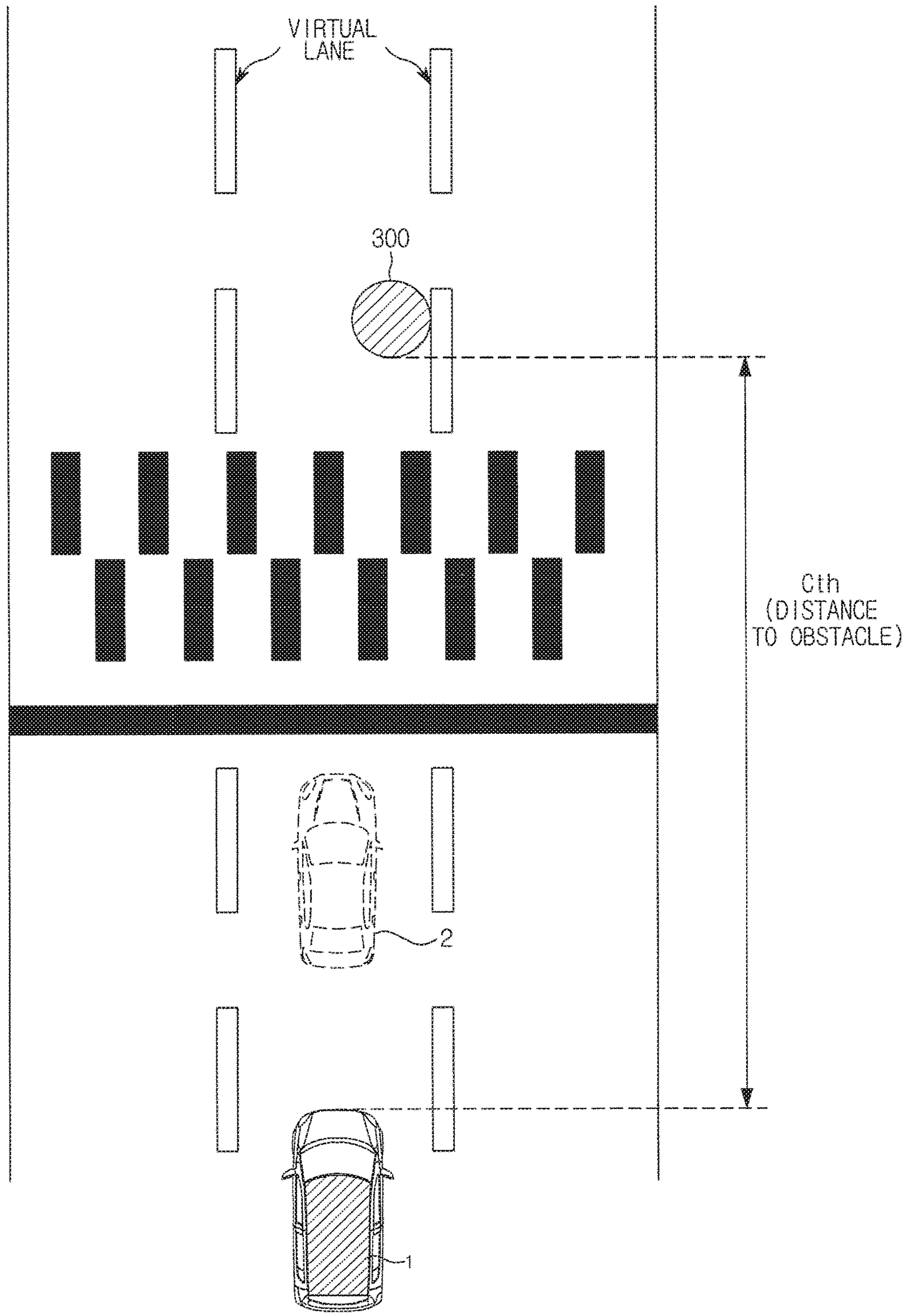
FIG. 7 shows an example of determining possibility of collision based on a distance to an obstacle, according to an embodiment of the present disclosure.
Figure 8:
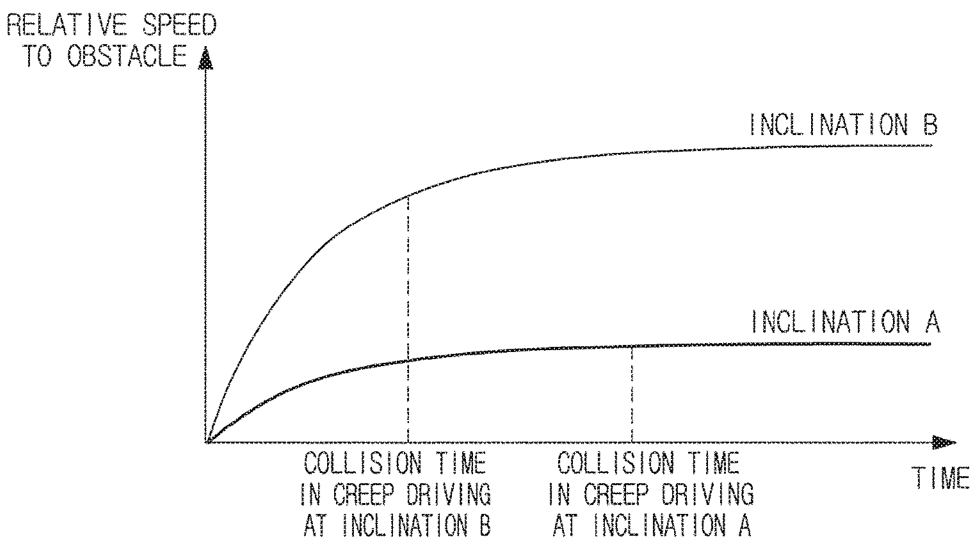
FIG. 8 shows relationships between creep driving speed and time at which collision may occur, which change by inclination, according to an embodiment of the present disclosure.

FIG. 5 is a flowchart illustrating a sequence of determining whether there is a possibility of collision, according to an embodiment of the present disclosure, and FIG. 6 shows moving history of a front car, according to an embodiment of the present disclosure. FIG. 7 shows an example of determining a distance to an obstacle, according to an embodiment of the present disclosure, and FIG. 8 shows relationships between creep driving speed and time at which collision may occur, according to an embodiment of the present disclosure.

Referring to FIG. 5, the vehicle 1 first determines whether the road is less inclined than a reference inclination, in S191.

In a case of releasing control of the distance between vehicles, creep torque is generated and thus, the vehicle 1 is likely to be pushed backward due to the creep torque. Accordingly, in S191, the vehicle 1 determines the inclination of a road on which the vehicle 1 is currently running, and then based on the determination result, determines if there is the risk of collision.

The reference inclination refers to an angle of the road that may make the vehicle pushed backward due to the creep torque, which may be set differently depending on the type and weight of the vehicle.

If the measured inclination of the road is greater than the reference inclination, it is likely that the vehicle 1 is pushed backward, and thus, it is determined that there is a possibility of collision, in S197 and the EPB is applied for safety of the vehicle, in S200.

However, if the measured inclination of the road is less than the reference inclination, it is determined if a history of a front vehicle is identified, in S192.

Identifying the history of the front vehicle is determining if the front vehicle has moved more than a certain distance Dth through normal driving by tracking a traveled trajectory of the front vehicle after stopping. In other words, as shown in FIG. 6, it is determined whether a front vehicle 2 followed by the vehicle 1 has traveled through normal driving by tracking a traveled path of the front vehicle 2.

Unlike what is shown in FIG. 6, if tracking the front vehicle 2 is failed and the moving history of the front vehicle 2 cannot be identified, it means that the vehicle 1 is unable to recognize appropriate surrounding conditions and thus it is more likely to have an accident due to another vehicle or obstacle 300. Accordingly, the vehicle 1 determines that there is a possibility of collision in such a case, and applies the EPB, in S200.

If the history traveled by the front vehicle is identified, the vehicle 1 determines whether there is an obstacle, e.g., the obstacle 300, in a virtual lane, in S193.

The virtual lane refers to a virtual road determined depending on an estimated traveling route and a road type, and if it is determined that there is no obstacle 300 in the virtual lane, it means that the vehicle 1 is in a safe driving condition. Accordingly, it is determined that there is no possibility of collision, in S196. Accordingly, no brake is applied and the right to control automatic driving is handed over to the user, in S210.

If there is the obstacle 300 in the virtual lane, it means that there is a possibility of collision with the obstacle 300, and so the vehicle 1 calculates duration of creep driving based on a distance to the obstacle 300 and determines if the duration exceeds a reference period of time, in S194, S195.

The creep driving refers to driving without putting on the brake, and it is common to do creep driving when the control of the distance between vehicles is released. The duration of the creep driving refers to a period of time until the vehicle collides with the obstacle 300 seen ahead after the vehicle starts creep driving from the current location, and the reference period of time refers to a period of time for which the driver is unable to avoid accident because the distance between the obstacle 300 and the vehicle 1 is relatively short during the creep driving. It may be determined depending on the type of the vehicle and conditions around the vehicle, or may be manually set by the user.

Accordingly, as shown in FIG. 7, once the history of the front vehicle 2 is identified, the virtual lane is set and it is determined if there is the obstacle 300 in the virtual lane. If there is the obstacle 300 in the virtual lane, a creep driving time is calculated using a distance Cth to the obstacle 300.

In the meantime, the reference period of time may be set based on the inclination of the road, as shown in FIG. 8. In other words, the creep driving speed varies by the inclination. Specifically, as the inclination increases, the speed becomes faster and thus a time to collide with the obstacle 300 becomes short. Accordingly, the reference period of time may vary in real time by the measured inclination. The inclination of the road may be obtained using the information obtained in S191.

S194 and S195 are a procedure to determine whether there is a possibility to collide with the obstacle 300. If the calculated time exceeds the reference period of time, it means that the vehicle 1 is at a relatively far distance from the obstacle 300, and it is thus determined that there is no possibility of collision, in S196. Accordingly, no brake is applied and the right to control automatic driving is handed over to the user, in S210.

If the calculated time does not exceed the reference period of time, it means that the vehicle 1 is at a relatively near distance from the obstacle 300, and it is thus determined that there is a possibility of collision, in S197, and the EPB is applied for safety of the vehicle 1, in S200.

Features and effects of embodiments of the present disclosure have been described with reference to accompanying drawings. The conventional automatically driven vehicle has a problem of not being accelerated even if the driver puts on the accelerator pedal because the brake is automatically applied even after the control of the distance between vehicles is released after stopping. It leads to dragging of the rear wheels, which might embarrass or give a sense of incongruity to the driver.

On the contrary, according to embodiments of the present disclosure, a vehicle determines a possibility of accident based on a distance to a front car and whether the user manipulates the input device, and hands over the right to control driving of the vehicle based on the determined possibility of accident, thereby reducing a sense of incongruity felt by the driver due to sudden start.

According to embodiments of the present disclosure, a vehicle determines a possibility of accident based on a distance to a front car and whether the user manipulates the input device when the vehicle is to hand over the right to control the vehicle to the user after stopping in an automatic driving stage, and hands over the right to control driving of the vehicle based on the determined possibility of accident, thereby reducing a sense of incongruity felt by the driver due to sudden start.

Although the present disclosure is described with reference to some embodiments as described above and accompanying drawings, it will be apparent to those ordinary skilled in the art that various modifications and changes can be made to the embodiments. For example, the aforementioned method may be performed in different order, and/or the aforementioned systems, structures, devices, circuits, etc., may be combined in different combinations from what is described above, and/or replaced or substituted by other components or equivalents thereof, to obtain appropriate results. Therefore, other embodiments and equivalents thereof may fall within the following claims.

What is claimed is:

1. A vehicle having an automatic driving control system which comprises:

a sensor configured to detect surroundings of the vehicle; and a controller configured to:

control automatic driving of the vehicle based on information obtained by the sensor, upon reception of a command for automatic driving from a user;

determine whether there is possibility of accident based on a distance to a front vehicle and whether the user manipulates an input;

release the automatic driving control of the vehicle based on the determination, when the vehicle is stopped in an automatic driving mode;

determine that there is possibility of accident when an inclination of a road is less than a reference inclination and a traveled route of the front vehicle is not identified;

set a virtual lane based on a driving route of the vehicle;

calculate an estimated duration of creep driving based on a distance to an obstacle when there is the obstacle in the virtual lane; and determine that there is possibility of accident when the estimated duration is less than a reference period of time.

2. The vehicle of claim 1, wherein the controller determines whether there is possibility of accident, when the distance to the front vehicle exceeds a reference range and the user manipulates the input.

3. The vehicle of claim 2, wherein the input comprises at least one of a switch to change driving modes of the vehicle and an accelerator pedal.

4. The vehicle of claim 3, wherein the controller releases the automatic driving control of the vehicle without determining possibility of accident when the user manipulates the accelerator pedal.

5. The vehicle of claim 3, wherein the controller determines whether there is possibility of accident when the user manipulates the switch.

6. The vehicle of claim 5, wherein the controller determines that there is possibility of accident when the inclination of the road on which the vehicle is running is greater than the reference inclination.

7. The vehicle of claim 5, wherein the controller applies an electronic parking brake (EPB) and release the automatic driving control of the vehicle, when determining that there is possibility of accident.

8. The vehicle of claim 1, wherein the controller maintains the automatic driving control of the vehicle without determining possibility of accident when the distance to the front vehicle is less than a reference range.

9. A method for controlling a vehicle having an automatic driving control system, the method comprising steps of:

detecting surroundings of the vehicle; and controlling automatic driving of the vehicle based on the detected information, upon reception of a command for automatic driving from a user, wherein the step of controlling the automatic driving of the vehicle comprises steps of:

determining whether there is possibility of accident based on a distance to a front vehicle and whether the user manipulates an input; and releasing, based on the determination, the automatic driving control of the vehicle, when the vehicle is stopped in an automatic driving mode, wherein the step of determining whether there is possibility of accident comprises:

determining that there is possibility of accident when an inclination of a road is less than a reference inclination and a traveled route of the front vehicle is not identified;

setting a virtual lane based on a driving route of the vehicle;

calculating an estimated duration of creep driving based on a distance to an obstacle when there is the obstacle in the virtual lane; and determining that there is possibility of accident when the estimated duration is less than a reference period of time.

10. The method of claim 9, wherein the step of determining whether there is possibility of accident comprises:

determining whether there is possibility of accident, when the distance to the front vehicle exceeds a reference range and the user manipulates the input.

11. The method of claim 10, wherein the input includes at least one of a switch to change driving modes of the vehicle and an accelerator pedal.

12. The method of claim 11, wherein the step of releasing the automatic driving control of the vehicle comprises:

releasing the automatic driving control of the vehicle without determining possibility of accident when the user manipulates the accelerator pedal.

13. The method of claim 11, wherein the step of determining whether there is possibility of accident comprises:

determining whether there is possibility of accident when the user manipulates the switch.

14. The method of claim 13, wherein the step of determining whether there is possibility of accident comprises:

determining that there is possibility of accident when the inclination of the road on which the vehicle is running is greater than the reference inclination.

15. The method of claim 13, wherein the step of releasing the automatic driving control of the vehicle comprises:

applying an electronic parking brake (EPB) and releasing automatic driving control of the vehicle, when it is determined that there is possibility of accident.

16. The method of claim 9, further comprising:

maintaining the automatic driving control of the vehicle without determining possibility of accident when the distance to the front vehicle is less than a reference range.

* * * * *